W. C. HEDGCOCK.
BRAKE BEAM SPRING CLIP.
APPLICATION FILED MAR. 30, 1917.
1,315,493.
Patented Sept. 9, 1919.
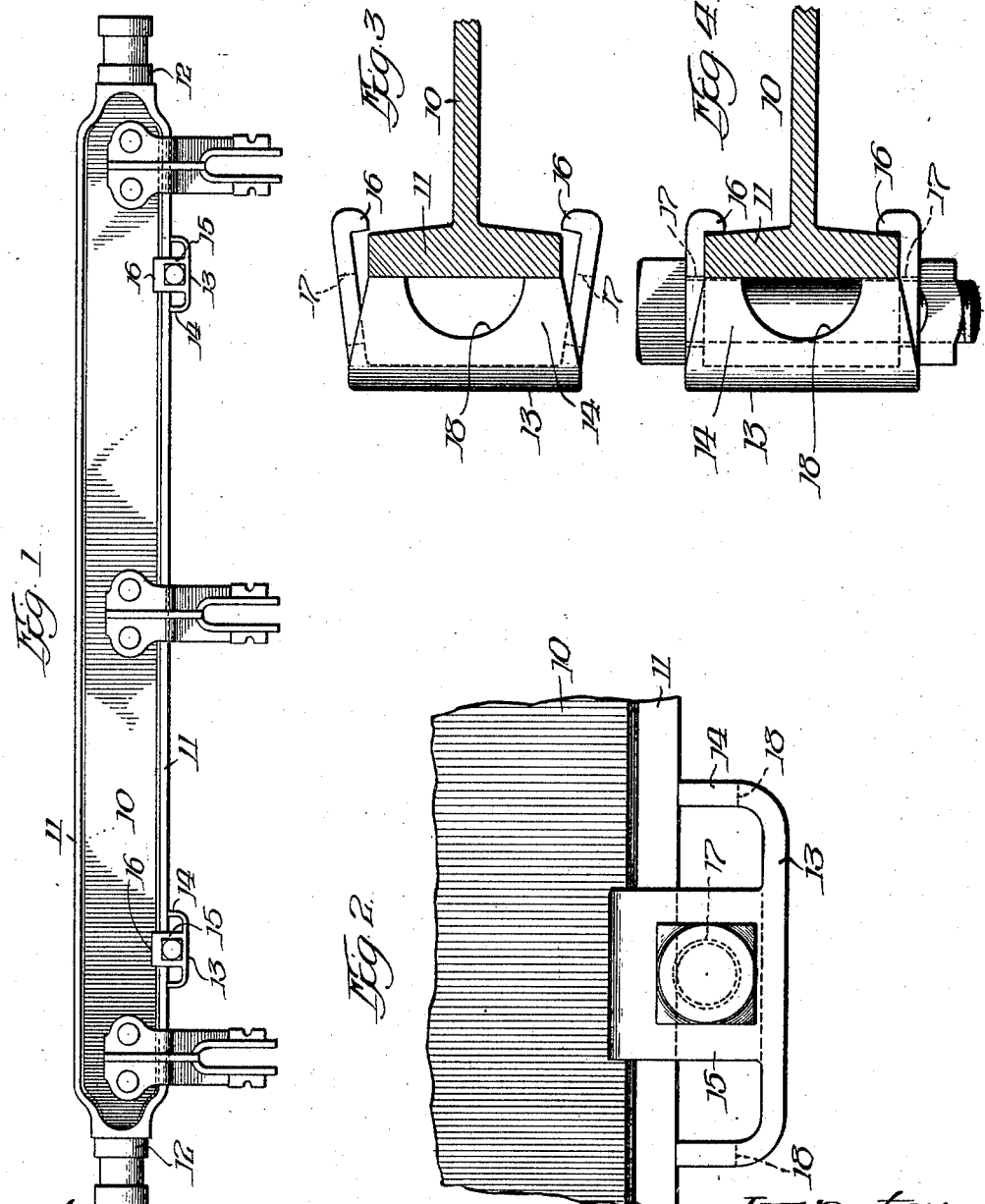

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE-BEAM SPRING-CLIP.

1,315,493.   Specification of Letters Patent.   Patented Sept. 9, 1919.

Application filed March 30, 1917. Serial No. 158,735.

*To all whom it may concern:*

Be it known that I, WILLIAM C. HEDGCOCK, a citizen of the United States, and resident of Chicago, in the county of Cook and State of Illinois, have invented certain new and useful Improvements in Brake-Beam Spring-Clips, of which the following is a specification.

My invention relates to brake beams, and has particular reference to a novel spring clip for use in connection therewith.

It is customary in common braking arrangements to employ release springs, by means of which the brakes are maintained out of engagement with the wheels, except when such engagement is required. Inasmuch as the release springs are, therefore, in frequent engagement with the beams considerable wear takes place, with the result that the beam is weakened. To obviate this I provide a clip adapted to be clamped on to the beam, provision being made for adjustment of the clip longitudinally of the beam as required.

A further object is to provide a clip which may be readily secured to a flanged beam without the necessity of perforating the beam.

The invention will be more readily understood by reference to the accompanying drawings in which:

Figure 1 is a plan view of a brake beam to which my improved clip has been applied;

Fig. 2 is an enlarged fragmentary view thereof;

Fig. 3 is an end view of the clip before the fastening bolt has been applied, and, Fig. 4 is a similar view showing the bolt in place.

The beam which I have illustrated is of I-shape in cross section, being composed of a web 10, flanges 11 and integral trunnions 12. The clip is composed of a plate 13, having two lateral lugs 14 and two lateral lugs 15. The ends of the former lugs 14 abut one side of a flange of the beam. The latter lugs are shaped as shown in Fig. 3 when the article is manufactured; that is, with the lugs slightly flared to permit the hooked ends 16 thereof to pass over the flange 11 of the beam. Apertures 17 in the lugs 15, accommodate a bolt 18, which is employed to deflect the lugs 15 into the position shown in Fig. 4. In this position the clip is securely clamped on to the beam with the capacity, however, of adjustment longitudinally of the beam upon loosening the bolt. Preferably the clip is composed of some ductile metal in order that it may be readily bent to the desired shape. The lugs 14 are preferably cut away at 18 in order to reduce weight.

In service the wear occasioned by the spring is assumed by the clip which may be readily replaced at small cost when excessive wear has taken place.

I claim:

A clip for brake beams, said clip being composed of a plate having four lateral projections, the ends of two projections being adapted to abut the side of a beam, and the ends of the other two being adapted to overlie and hook around the flange on the beam, substantially as described.

Signed at Chicago, Illinois, this 23rd day of March, A. D. 1917.

WILLIAM C. HEDGCOCK.

Witnesses:
GEO. S. CHILES,
GEORGE A. PETERSON.

Copies of this patent may be obtained for five cents each, by addressing the "Commissioner of Patents, Washington, D. C."